(12) United States Patent
Kramer et al.

(10) Patent No.: US 8,797,271 B2
(45) Date of Patent: Aug. 5, 2014

(54) INPUT AGGREGATION FOR A MULTI-TOUCH DEVICE

(75) Inventors: Doug Kramer, Bothell, WA (US); Kevin Kennedy, Kirkland, WA (US); Maxim Mazeev, Redmond, WA (US); Sundaram Ramani, Redmond, WA (US); Robert Levy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1597 days.

(21) Appl. No.: 12/038,774

(22) Filed: Feb. 27, 2008

(65) Prior Publication Data

US 2009/0213084 A1  Aug. 27, 2009

(51) Int. Cl.
*G06F 3/0488* (2013.01)

(52) U.S. Cl.
USPC ........... 345/173; 345/174; 345/175; 345/176; 345/178; 178/18.01; 178/18.02; 178/18.03; 178/18.07; 178/19.01

(58) Field of Classification Search
USPC .................. 345/170–180; 173/18.01–19.01
See application file for complete search history.

(56) References Cited

U.S. PATENT DOCUMENTS

| | | | |
|---|---|---|---|
| 5,952,599 A | 9/1999 | Dolby et al. | |
| 5,999,169 A * | 12/1999 | Lee | 345/163 |
| 6,323,789 B1 | 11/2001 | Lawrence | |
| 6,323,846 B1 * | 11/2001 | Westerman et al. | 345/173 |
| 6,709,331 B2 | 3/2004 | Berman | |
| 7,164,410 B2 | 1/2007 | Kupka | |
| 7,576,726 B2 * | 8/2009 | Harley et al. | 345/157 |
| 7,620,915 B2 * | 11/2009 | Ludwig | 715/856 |
| 2006/0026536 A1 * | 2/2006 | Hotelling et al. | 715/863 |
| 2007/0152984 A1 * | 7/2007 | Ording et al. | 345/173 |
| 2007/0262964 A1 | 11/2007 | Zotov et al. | |

OTHER PUBLICATIONS

Hoshino, et al.,"Transputer Network for Dynamic Control of Multiple Manipulators", IEEE, 1993, pp. 864-869.
Izadi, et al., "C-Slate: A Multi-Touch and Object Recognition System for Remote Collaboration using Horizontal Surfaces", In IEEE Conference on Horizontal Interactive Human-Computer Systems, 2007, pp. 8.
Izadi, et al.,"ThinSight: Integrated Optical Multi-touch Sensing through Thin Form-factor Displays", In Proceedings of SIGRRAPH Emerging Displays Technologies: Images and Beyond—the Future of Displays and Interaction SIGGRAPH EDT'07, vol. 252, ACM, 2007, pp. 4.

* cited by examiner

*Primary Examiner* — Grant Sitta
(74) *Attorney, Agent, or Firm* — Jeremy Snodgrass; Glen Johnson; Micky Minhas

(57) ABSTRACT

The aggregation of multiple inputs in a touch-sensitive input device is disclosed. For example, one disclosed embodiment comprises receiving multiple inputs related to a virtual object, aggregating the inputs into an aggregated output, and providing the aggregated output to an application that controls the virtual object.

20 Claims, 5 Drawing Sheets

INPUT AGGREGATION FOR A MULTI-TOUCH DEVICE

BACKGROUND

Touch-sensitive devices may detect touch-based inputs via several different mechanisms, including but not limited to optical, resistive, and capacitive mechanisms. Some optical touch-sensitive devices detect touch by capturing an image of a backside of a touch screen via an image sensor, and then processing the image to detect objects located on the screen.

One difficulty that may be encountered with a touch-sensitive device is related to processing multiple inputs on the touch-sensitive device. For example, touch-based input applications provide convenient and intuitive manipulation of virtual objects in software. With a single input, the process of translating the behavior of a mouse, finger, stylus, or other manipulator, into movement of a virtual object is straightforward. However, when using a multi-touch input device, manipulators can simultaneously impact the same virtual object and complicate a programming model used to operate on the virtual object.

As an example, a virtual photograph may be manipulated with a single finger input. In relation to finger inputs, a virtual photograph may move the same amount as the finger, presenting a readily understandable input for developers and programmers of touch-sensitive devices and applications that may run on them. In contrast, moving several fingers simultaneously may present developers with a new interaction model. For example, treating each manipulator independently may not generate coherent results, as a user may intuitively expect their fingers to act as a coordinated input.

SUMMARY

Accordingly, various systems, methods, and apparatus for the aggregation of multiple inputs in a touch-sensitive input device are disclosed below in the Detailed Description. For example, one disclosed embodiment comprises receiving multiple inputs related to a virtual object, aggregating the inputs into an aggregated output, and providing the aggregated output to an application that controls the virtual object. This allows multiple touch inputs related to a virtual object to be interpreted in a consistent manner by multiple applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
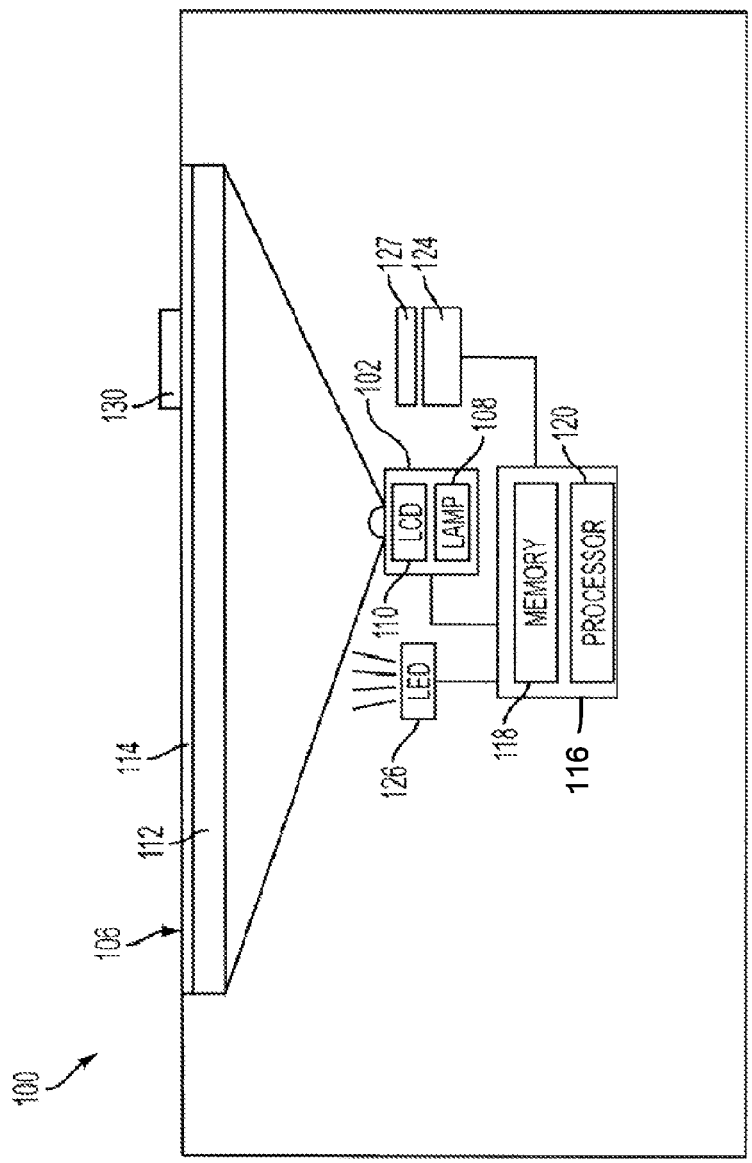
FIG. 1 shows an embodiment of an optical touch-sensitive device.

Prior to discussing the aggregation of multiple touch-based inputs in a touch-sensitive device, an embodiment of a suitable use environment is described. FIG. 1 shows a schematic depiction of an embodiment of an optical touch-sensitive device in the form of an interactive display device 100. The interactive display device 100 comprises a projection display system having an image source 102, and a display screen 106 onto which images are projected. While shown in the context of a projection display system, it will be appreciated that the embodiments described herein may also be implemented with other suitable display systems, including but not limited to LCD panel systems.

The image source 102 includes a light source 108 such as a lamp (depicted), an LED array, or other suitable light source. The image source 102 also includes an image-producing element 110 such as the depicted LCD (liquid crystal display), an LCOS (liquid crystal on silicon) display, a DLP (digital light processing) display, or any other suitable image-producing element.

The display screen 106 includes a clear, transparent portion 112, such as sheet of glass, and a diffuser screen layer 114 disposed on top of the clear, transparent portion 112. As depicted, the diffuser screen layer 114 acts as a touch surface. In other embodiments, an additional transparent layer (not shown) may be disposed over diffuser screen layer 114 as a touch surface to provide a smooth look and feel to the display surface. Further, in embodiments that utilize a LCD panel rather than a projection image source to display images on display screen 106, the diffuser screen layer 114 may be omitted.

Continuing with FIG. 1, the display device 100 further includes an electronic controller 116 comprising memory 118 and a microprocessor 120 configured to conduct one or more input aggregation operations, as described below. It will further be understood that memory 118 may comprise instructions stored thereon that are executable by the processor 120 to control the various parts of device 100 to effect the methods and processes described herein.

To sense objects placed on display screen 106, the display device 100 includes an image sensor 124 configured to capture an image of the entire backside of display screen 106, and to provide the image to electronic controller 116 for the detection of objects appearing in the image. The diffuser screen layer 114 helps to avoid the imaging of objects that are not in contact with or positioned within a few millimeters of display screen 106, and therefore helps to ensure that only objects that are touching or in close proximity to display screen 106 are detected by image sensor 124.

The image sensor 124 may include any suitable image sensing mechanism. Examples of suitable image sensing mechanisms include but are not limited to CCD and CMOS image sensors. Further, the image sensing mechanisms may capture images of display screen 106 at a sufficient frequency to detect motion of an object across display screen 106. While the embodiment of FIG. 1 shows one image sensor, it will be appreciated that more than one image sensor may be used to capture images of display screen 106.

The image sensor 124 may be configured to detect light of any suitable wavelength, including but not limited to infrared and visible wavelengths. To assist in detecting objects placed on display screen 106, the image sensor 124 may further include an illuminant 126 such as one or more light emitting diodes (LEDs) 126 configured to produce infrared or visible light to illuminate a backside of display screen 106. Light from illuminant 126 may be reflected by objects placed on display screen 106 and then detected by image sensor 124. The use of infrared LEDs as opposed to visible LEDs may help to avoid washing out the appearance of images projected on display screen 106. Further, an infrared bandpass filter 127 may be utilized to pass light of the frequency emitted by the illuminant 126 but prevent light at frequencies outside of the bandpass frequencies from reaching the image sensor 124, thereby reducing the amount of ambient light that reaches the image sensor 124.

FIG. 1 also depicts an object 130 placed on display screen 106. Light from the illuminant 126 reflected by object 130 may be detected by image sensor 124, thereby allowing the object 130 to be detected on the screen. Object 130 represents any object that may be in contact with display screen 106, including but not limited to a mouse, finger, stylus, or other manipulator. It will be appreciated that the interactive display device 100 may detect and track multiple temporally overlapping touches from any suitable number of manipulators (i.e. potentially as many manipulator or object touches as can fit on the display screen 106 at a time), and may be configured to detect and distinguish the touch of many different types of manipulators and objects.

Further, while described herein in terms of a projection display system with an optical detector, it will be understood that the disclosed embodiments may be used with any suitable touch-sensitive display system that utilizes any suitable touch detection system. Examples include, but are not limited to, resistive and capacitive touch sensing mechanisms, as well as other optical detection systems such as scanning infrared laser detection systems, etc.

Various systems, methods, and apparatus for the aggregation of multiple inputs in a touch-based input device will now be described. The disclosed implementations of a manipulation processor are intended to aggregate multiple inputs from multiple manipulators to produce affine two-dimensional transformations, but other embodiments are not so limited. For example, some embodiments may produce one dimensional manipulations (i.e. along one degree of freedom) or three-dimensional manipulations as well.

Figure 2:
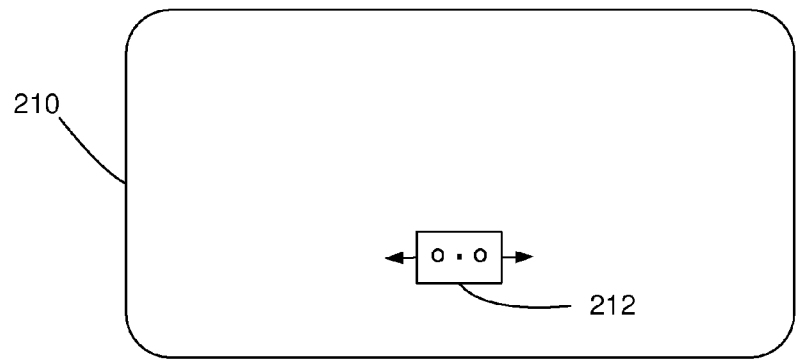
FIG. 2 illustrates multiple inputs on a touch-sensitive device.

First, a multi-input usage environment is described in reference to FIG. 2, which illustrates multiple inputs on a touch-sensitive device 210. In this example, FIG. 2 depicts an area 212 of a touch-sensitive device deemed to have two or more inputs that are coordinated. Inputs may be deemed to be coordinated, for example, if they are linked to a common virtual object displayed on a touch-sensitive display screen. Examples of virtual objects may include, but are not limited to, icons, graphics, photographs, windows, etc. In the illustrated example, one circle represents a first finger input and the other circle represents a second finger input, but embodiments are not so limited. For example, more than two touches may be made in area 212 (from three to as many as can fit within area 212), or only a single touch input may be made. Likewise, touch-sensitive device 210 may comprise multiple areas similar to area 212, wherein each of the multiple areas may include multiple coordinated inputs. Further, touches by manipulators other than fingers may also be recognized. The term "touch-based input" as used herein may represent a touch by any suitable manipulator or object, such as a finger, stylus, brush, etc. Further, in some embodiments where a touch-sensitive device is configured to detect a "hovering" object (i.e. a near-touch), such as some optical touch-sensitive devices, the term "touch-based input" also may signify a near-touch hover input. As such, where specific embodiments are described herein in the context of fingers, it will be understood that such descriptions also apply to any other suitable manipulator. Further, while the terms "first touch" and "second touch" and the like are used herein to describe various embodiments, it will be understood that the embodiments described support the aggregation of any number of touches greater than two, and that the terms "first and second" signify only a first and second touch of a set of two or more touches.

FIG. 2 also illustrates an aggregated representation of the multiple inputs in area 212 in the form of an average location of the inputs. For example, by representing the two inputs in area 212 as an average location, the basic input movements may be processed and conveniently provided as an aggregated output based on basic movements of or changes related to the average location. The term "aggregated output" as used herein denotes the aggregation of movements of a plurality of individual manipulators into movements or operations performed relative to a consolidated reference point or frame, such as the average location of all manipulators. Once multiple inputs are reduced to an aggregated representation, then intended inputs such as translation, rotation and scaling, may be represented by adjustments made to the displayed virtual object related to the average location of the manipulators on the virtual object.

For example, the illustrated embodiment depicts outward facing arrows representing the two inputs in area 212. By moving the two inputs apart from each other, the average location may change little if at all, but the average distance from the inputs to the average location will increase. By measuring the change in average distance of each touch input location from the average location, a scaling factor may be determined and the inputs may be interpreted as an aggregated output to scale a virtual object, such as a virtual photo. Likewise, in some embodiments, a rotation about the average location may be determined by calculating an angle of a line extending between the average location and each touch location relative to a reference direction (such as an "up" direction defined as zero degrees), determining an average of all such angles relative to the preselected direction, and then determining a change in this average angle between successive inputs. The resulting angular change may be provided as an aggregated output to represent a rotation of a virtual object. Further, movements of the average location may be interpreted as translation of the virtual object. In some embodiments, any combination of position, translation, rotation or scaling may be depicted in an aggregated output, such as the data structure described in reference to FIG. 5.

In one example, an input device may detect a first touch-based input by a first manipulator (such as a finger) touching the input device at a specific location, such as an X, Y coordinate (20,20) on the device. Then, the input device may determine that a second touch-based input is a second manipulator (such as another finger) that is touching the device at the X, Y coordinate of (30,15). The input device may determine that the second coordinate is a second finger in any suitable manner. For example, the timing and location of the touches may dictate they are different fingers, as would be the case if the first finger was still touching the input device when the second touch-based input was detected (i.e. the inputs are temporally overlapping).

Next, the input device may detect that the first finger changes position to (15, 23) while the second finger changes position to (35,15). In this example, the manipulation processor may determine the average location for the first touch-based input of each of the two, and then represent that as an origin in X,Y coordinates, which in this example would be (25,17.5). Then, the manipulation processor may determine the average location for the second touch-based input of the two fingers, and then represent that as the location (25,19). Then, the manipulation processor may aggregate the inputs, and provide a vector representation comprising (0,−1.5), wherein (0,−1.5) indicates the change in location of the average location. This in turn can be resolved to the average location making a translation of the virtual object, as a non-limiting example. Other examples may generate a rotation, a scaling factor, or any combination of these three types, or any other suitable type, of aggregated outputs. While described in the context of two manipulators in the form of two fingers, it will be understood that inputs from any number of inputs from any number of manipulators may be aggregated into an aggregated output in this manner.

In this way, by aggregating multiple-inputs, embodiments may provide a re-usable component useable by multiple applications, thereby providing consistent interpretation of multi-manipulator gestures, reducing the amount of algorithms that need to be written, and providing consistent input scheme for a user across multiple applications to facilitate the learning of supported gestures. Additionally, a software developer may benefit by having an aggregated input (i.e. the aggregated output of the manipulation processor) that represents the same user inputs that would otherwise be distributed over multiple inputs. This simplified programming model allows a developer to concentrate on the effects of a manipulation on the developer's specific virtual object. To manipulate a photo, for example, a developer may write a program to move, scale, or rotate the photograph by the amount indicated by the manipulation processor output, without having to determine how much each input individually contributed.

Figure 3:
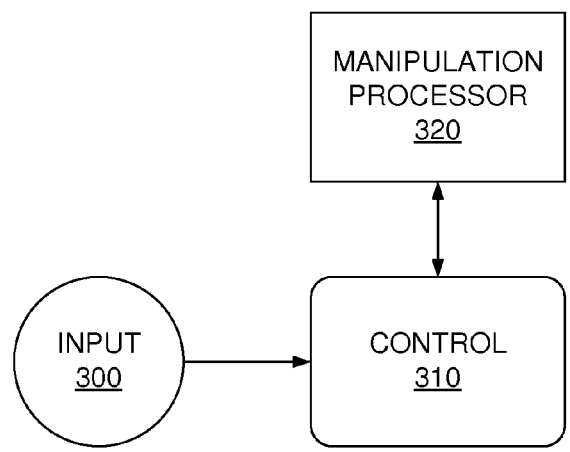
FIG. 3 shows an example of process modules in a direct usage embodiment touch-sensitive device.

FIG. 3 shows an example of process modules in a direct usage embodiment. The depicted direct usage embodiment comprises an input 300 in communication with a control 310. The control may be a dedicated control module, an application, or other module that may receive inputs from input 300. For example, in one specific embodiment, control 310 may be an application that controls the appearance of a displayed photograph or other virtual object. Control 310 is also in communication with a manipulation processor 320. A benefit of this configuration is that all inputs are passed through control 310. Therefore, control 310 can batch multiple inputs together, and can filter inputs received from input 300, for example, to only forward inputs deemed relevant to manipulation processor 320. As a specific example, one control may be configured to recognize input only from fingers, while another control may be configured to recognize objects such as a stylus, cell phone, camera, optically readable tag, etc. Each control can therefore examine the type of input received from the input device, and determine whether to forward the input to the manipulation aggregator for aggregation.

After receiving the inputs forwarded by control 310, the manipulation processor 320 aggregates the inputs as described above, and then provides an aggregated output to control 310. Control 310 then may interpret the aggregated output from manipulation processor 320 to determine how to vary an image displayed on the touch-sensitive display in response to the aggregated output.

Figure 4:
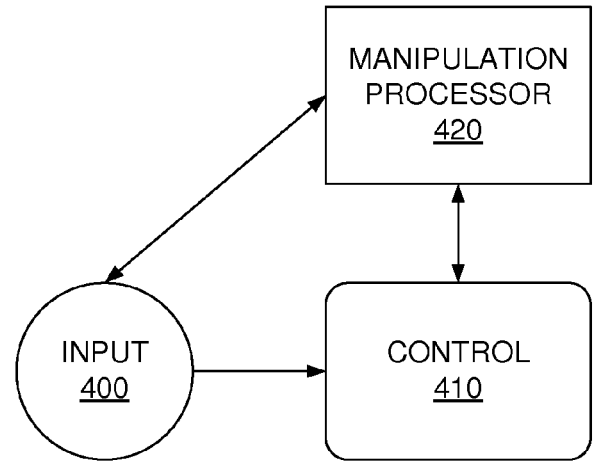
FIG. 4 shows an example of process modules in an automatic tracking embodiment touch-sensitive device.

In contrast, FIG. 4 shows an example of process modules in an automatic tracking embodiment touch-sensitive device. The depicted automatic tracking embodiment comprises an input 400 in communication with a control 410. The control may be a dedicated control module, an application, or other module that may receive inputs. Control 410 is also in communication with a manipulation processor 420.

In an automatic tracking embodiment, upon receiving an input from a newly detected manipulator, if the control is interested in receiving inputs from the manipulator, the control may send the input to the manipulation processor signifying that the control is interested in tracking that manipulator. The manipulation processor may then receive input directly from the input 400 for that manipulator until the manipulator is lifted from the touch-sensitive surface. Therefore, as opposed to the direct usage model, only the first input from a newly detected manipulator is filtered by the control. Manipulation processor 420 then aggregates inputs directly received from input 400 for each manipulator for which control 410 has indicated interest, and provides an aggregated output to control 410. The automatic tracking embodiment depicted in FIG. 4 may increase the demands on the manipulation processor, for example in relation to knowledge of a specific input system, but in return the automatic tracking embodiment may provide a simpler model for the control.

The input provided by inputs 300, 400 may have any suitable format. For example, in one embodiment, each input may comprise an identification of the manipulator causing the input (e.g. "Finger 1") and the location of the manipulator on the touch-sensitive display (e.g. X,Y coordinates). As each manipulator is moved on the display screen, the input for each manipulator comprises the identification of the manipulator and the X,Y coordinates of the new location. Likewise, when a new manipulator is detected, the new manipulator is assigned an identification, and the identification and X,Y coordinates are provided as an origin for the new manipulator.

Other inputs than X,Y coordinates may also be provided. For example, in some embodiments, a single manipulator may be provided as an input for aggregation to detect rotation. In such an embodiment, the manipulation processor would be given as input a "pivot point" about which rotation of a detected manipulator may occur Further, in some embodiments, an additional rotation-based input may be a "pivot radius" that specifies a dampening effect for a detected rotation around the pivot point as the rotation nears the pivot point. It will be understood that these are merely examples of inputs that may be provided for aggregation, and that any suitable quantity related to any suitable detected manipulator may be provided as input for aggregation.

Figure 5:
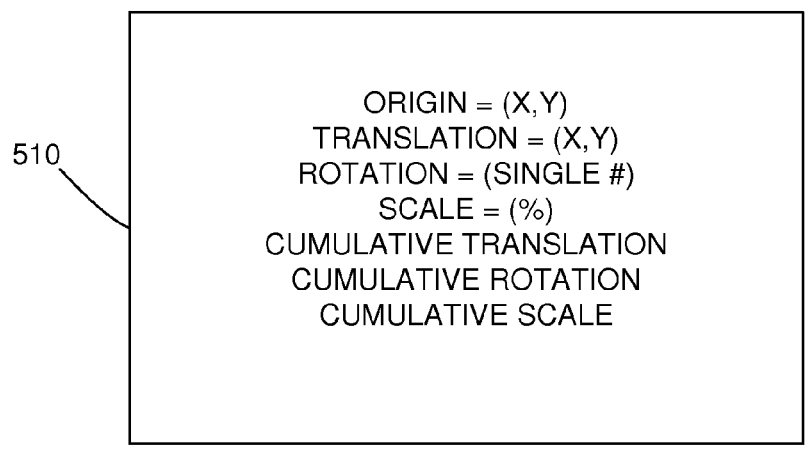
FIG. 5 shows an embodiment of a data structure for an aggregated output of a manipulation processor according to embodiments of the present disclosure.

The aggregated output may have any suitable format. For example, in some embodiments, the aggregated output provided by the manipulation processor to the control may include information related to one or more of a position, a translation, a rotation and a scaling of the virtual object. FIG. 5 shows an embodiment of an example of a data structure 510 for an aggregated manipulation processor output. The depicted data structure is for a manipulation delta using the average location embodiment described with reference to FIG. 2; however, other embodiments are not so limited. Additionally, other embodiments of data structure may include different combinations or sub-combinations of elements of data structure 510, other elements, or even other suitable data structures.

Referring to the embodiment in FIG. 5, the data structure 510 includes information regarding the location of an origin, in X and Y coordinates. In some embodiments, other suitable coordinate systems may be used. The origin may represent an aggregated average location of a plurality of manipulators, or may represent any other suitable aggregation of the locations of the manipulators.

Data structure 510 also includes a current translation including X and Y information consistent with the aggregated origin representation. Translation X, Y may include endpoints to be used in conjunction with the origin information, or may include vectors representing a change to be combined with the origin X, Y location information. Data structure 510 further includes a rotation represented as a single number, for example either in degrees or radians format. In this example, the rotation may be determined by the average rotation of multiple manipulators about the aggregated origin relative to a reference direction.

Data structure 510 also includes a scale factor, whereby an average change in distance of a plurality of inputs relative to the aggregated origin may be determined to correspondingly scale a virtual object. In some embodiments, the scale factor may simply be a simple multiplier, wherein the value 1 provides the original scale, while percentages provide the corresponding percentage scale factor, and multiples provide the corresponding multiple scale factor.

In some embodiments, data structure 510 also may include cumulative information, such as a cumulative translation, cumulative rotation and cumulative scale factor of a virtual object.

Further, in some embodiments, the manipulation processor may support other types of aggregated outputs, such as gestures representing a scroll wheel input (e.g. a scrolling speed and direction), a virtual object zoom, a tap input (e.g. selecting an object or directing the execution of an executable file) that may comprise one or more taps, or any other combination of inputs that may be represented as an aggregated output. In the case of a multiple tap gesture, the aggregation of multiple inputs may be considered to be temporally aggregated in that non-temporally overlapping touch inputs are aggregated, whereas gestures involving multiple simultaneous touches may be considered to be spatially aggregated in that temporally overlapping but spatially non-overlapping inputs are aggregated. As yet another example of a temporally non-overlapping gesture, a touch-and-hold gesture may be recognized in which the touch-down, hold, and touch-lift operations are considered separate inputs that are aggregated into a single output. Further, some gestures may comprise both temporally and spatially aggregated inputs.

It will be understood that the control receiving the aggregated output from the manipulation processor may choose to ignore one or more of the types of information contained within the aggregated output and/or the manipulation processor may be configured to allow the enabling or disabling of any supported aggregated gestures (such that the aggregated gesture will or will not appear in the aggregated output).

Figure 6:
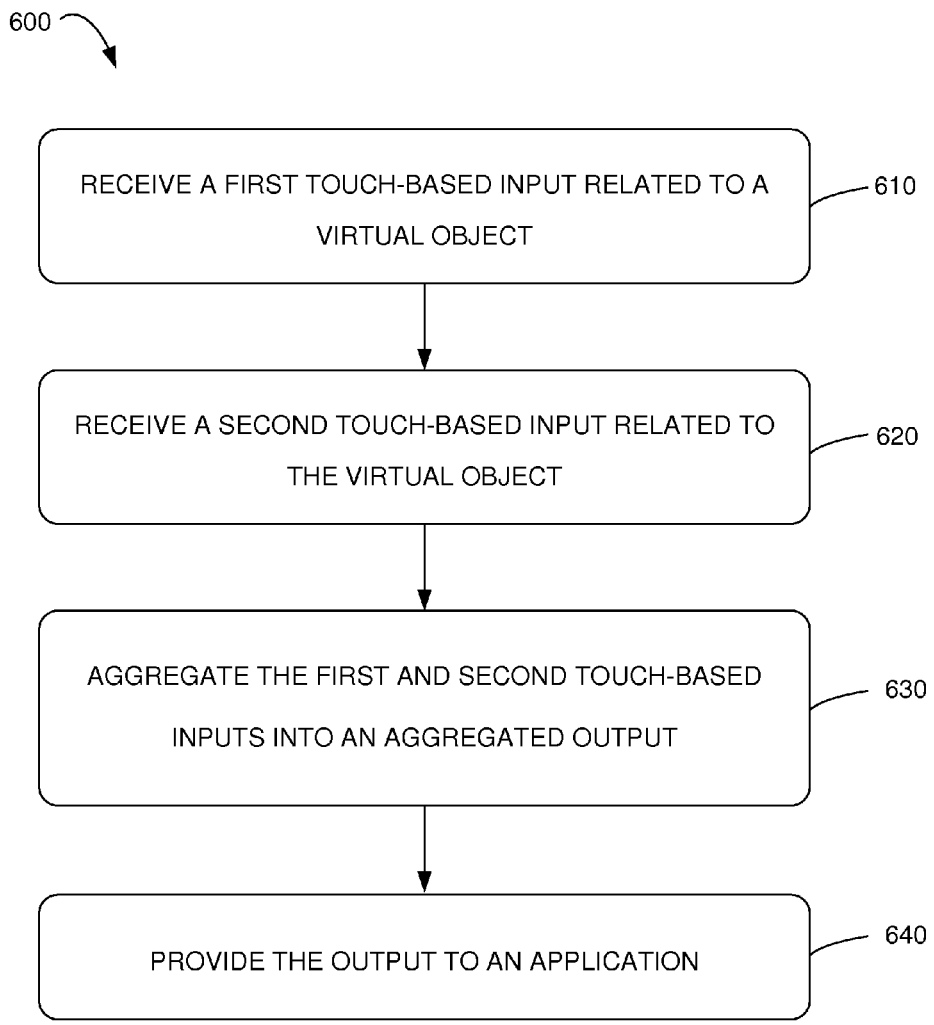
FIG. 6 shows a flow diagram illustrating an embodiment of a method for input aggregation.

FIG. 6 shows a flow diagram illustrating an embodiment of a method 600 for aggregating a plurality of inputs from a touch-sensitive input device. Referring to the figure, method 600 may aggregate multiple inputs in a touch-based input device by receiving from a first manipulator a first touch-based input related to a virtual object as illustrated in block 610. Next, method 600 may receive from a second manipulator a second touch-based input related to the virtual object in block 620. The first and second touch-based inputs may be received, for example, from a control such as an application that displays the virtual object. Further, the first and second touch-based inputs may be temporally non-overlapping touch-based inputs (such as a multi-tap input), or spatially non-overlapping touch-based inputs (such as multiple fingers touching a display at different locations over a virtual object). In this way, method 600 may aggregate the first touch-based input and the second touch-based input into an aggregated output as illustrated in block 630. Then, as indicated in block 640, the aggregated output is provided to the application. In this way, the application can use the aggregated output to manipulate the virtual object.

In some embodiments, the aggregated output may include information related to one or more of a position, a translation, a rotation and a scaling of the virtual object. Further, the information related to a position and translation may be represented as an average location of the first touch-based input and the second touch-based input as described above with reference to FIGS. 1-5, while the information related to rotation or a scaling each may be represented as single numbers that signify a degree of rotation and scaling to be performed. While described in the context of a translation, rotation or scaling about an average point or an average location, embodiments may aggregate inputs in other suitable manners to provide an aggregated output in any other suitable form. Additionally, any portion of the information may be enabled or disabled. For example, the information related to a translation, rotation or scaling of the virtual object can be enabled or disabled, wherein the aggregated output will only be determined by the information that is enabled.

Figure 7:
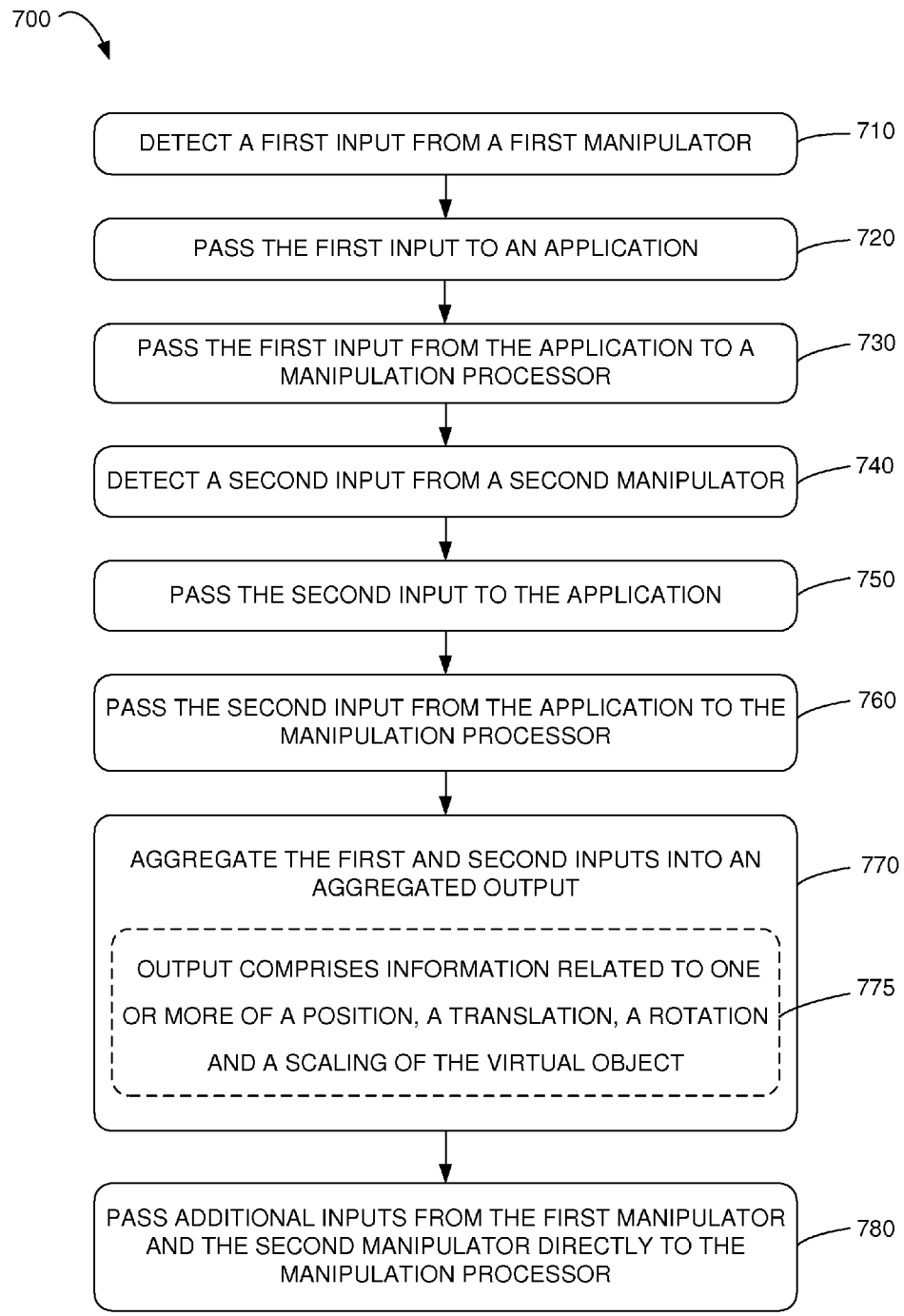
FIG. 7 shows a flow diagram illustrating an embodiment of another method for input aggregation.

FIG. 7 shows a flow diagram illustrating an embodiment of a method 700 for aggregating a plurality of inputs from a touch-sensitive input device in an automatic tracking implementation, wherein the inputs relate to a virtual object. First, as illustrated in block 710, method 700 comprises detecting a first touch-based input from a first manipulator. The first touch-based input is then passed to a control application, as shown in block 720. Next, as indicated in block 730, the first touch-based input is passed from the application to a manipulation processor. In block 740, method 700 comprises detecting a second touch-based input from a second manipulator. The second touch-based input is then passed to the control application in block 750, and then is passed from the application to the manipulation processor in block 760. Next, in block 770, method 700 comprises aggregating the first and second touch-based inputs into an aggregated output. The first and second touch-based inputs may be temporally non-overlapping touch-based inputs (such as a multi-tap input), or spatially non-overlapping touch-based inputs (such as multiple fingers touching a display at different locations over a virtual object). In some embodiments and as illustrated with reference to block 775, the aggregated output may include information related to one or more of a position, a translation, a rotation and a scaling of the virtual object, as discussed above in reference to FIGS. 1-6. Then, as indicated in block 780, additional inputs from at least one of the first manipulator and the second manipulator may be passed directly to the manipulation processor. While described in the context of a translation, rotation or scaling about an average point or an average location, embodiments may aggregate inputs in other suitable manners to provide an aggregated output in any other suitable form.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, surface computing devices, personal computers, servers, laptop computers, hand-held devices, microprocessor-based programmable consumer electronics and/or appliances, routers, gateways, hubs and other computer networking devices, PDAs, navigation devices, cellular telephones, GPS receivers, etc.

While disclosed herein in the context of an optical touch-sensitive display device, it will be appreciated that the disclosed embodiments may also be used in any other suitable touch-sensitive device. It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of aggregating multiple inputs from a touch-based input device, the method comprising:
    displaying a virtual object that is controlled by a control;
    receiving a first touch-based input related to the virtual object;
    receiving a second touch-based input related to the virtual object;
    forwarding the first touch-based input and the second touch-based input from the control to a manipulation processor;
    aggregating via the manipulation processor the first touch-based input and the second touch-based input into an aggregated output;
    providing the aggregated output to the control; and
    varying a display of the virtual object based upon the aggregated output.

2. The method of claim 1, wherein the aggregated output comprises information related to one or more of a position, a translation, a rotation and a scaling of the virtual object.

3. The method of claim 2, wherein the information related to a position comprises an average location of the first touch-based input and the second touch-based input.

4. The method of claim 2, wherein the information related to a translation comprises a translation of an average location of the first touch-based input and the second touch-based input.

5. The method of claim 2, wherein the information related to a rotation comprises a degree of rotation about an average location of the first touch-based input and the second touch-based input relative to a reference direction.

6. The method of claim 1, wherein aggregating the first touch-based input and the second touch-based input into an aggregated output comprises aggregating spatially non-overlapping touch-based inputs into an aggregated output.

7. The method of claim 1, wherein aggregating the first touch-based input and the second touch-based input into an aggregated output comprises aggregating temporally non-overlapping touch-based inputs into an aggregated output.

8. A computer-readable storage medium excluding a signal per se, the computer-readable storage medium comprising instructions executable by a computing device to aggregate inputs from a multi-touch input device, the inputs being related to a virtual object, and the instructions being executable to perform a method comprising:
    detecting a first touch-based input from a first manipulator;
    passing the first touch-based input to an application;
    passing the first touch-based input from the application to a manipulation processor;
    detecting a second touch-based input from a second manipulator;
    passing the second touch-based input to the application;
    passing the second touch-based input from the application to the manipulation processor;
    aggregating the first and second touch-based inputs into an aggregated output comprising information related to one or more of a position, a translation, a rotation and a scaling of the virtual object; and
    passing additional inputs from the first manipulator and the second manipulator directly to the manipulation processor.

9. The computer-readable storage medium of claim 8, wherein the information related to a position comprises an average location of the first touch-based input and the second touch-based input.

10. The computer-readable storage medium of claim 8, wherein the information related to a translation comprises a translation of an average location of the first touch-based input and the second touch-based input.

11. The computer-readable storage medium of claim 8, wherein the information related to a rotation comprises a degree of rotation about an average location of the first touch-based input and the second touch-based input relative to a reference direction.

12. The computer-readable storage medium of claim 8, wherein the information related to a scaling is a scaling of the first touch-based input and the second touch-based input in relation to an average location.

13. The computer-readable storage medium of claim 8, wherein the information further comprises information regarding one or more of a wheel input, a virtual object zoom, a tap, and a touch-and-hold.

14. An apparatus comprising:
    a touch-sensitive display comprising a touch-sensing mechanism configured to detect multiple touch inputs related to a virtual object displayed on the display; and
    a controller in communication with the touch-sensitive display, the controller comprising a processor and memory comprising computer-readable instructions executable by the processor to:
    display the virtual object on the touch-sensitive display, the virtual object being controlled by a control application;
    at the control application, receive from the touch-sensing mechanism a set of one or more touch-based inputs related to the virtual object from a first type of manipulator;
    at the control application, receive from the touch-sensing mechanism a set of one or more touch-based inputs related to the virtual object from a second type of manipulator;
    forward the set of touch-based inputs from the first type of manipulator to a manipulation processor, and not forward the set of one or more touch based inputs from the second type of manipulator to the manipulation processor;
    via the control application, adjust an appearance of the virtual object based on the set of one or more touch-based inputs from the second type of manipulator;

aggregate the set of one or more touch-based inputs sent to the manipulation processor into an aggregated output at the manipulation processor;

provide the aggregated output to the control application; and adjust an appearance of the virtual object based on the aggregated output.

15. The apparatus of claim 14, wherein the aggregated output comprises information related to one or more of a position, a translation, a rotation and a scaling of the virtual object.

16. The apparatus of claim 15, wherein the information related to a position comprises an average location of the first touch-based input and the second touch-based input.

17. The apparatus of claim 15, wherein the information related to a translation comprises a translation of an average location of the first touch-based input and the second touch-based input.

18. The apparatus of claim 15, wherein the information related to a rotation comprises a degree of rotation about an average location of the first touch-based input and the second touch-based input relative to a reference direction.

19. The apparatus of claim 15, wherein the information related to a scaling comprises a scaling of the first touch-based input and the second touch-based input in relation to an average location.

20. The apparatus of claim 15, wherein any of the translation, rotation and scaling of the virtual object can be enabled or disabled as the aggregated output.

\* \* \* \* \*